United States Patent Office 3,459,770
Patented Aug. 5, 1969

3,459,770
INDOLEGLYOXYLOYLPYRROLES
Meier E. Freed, Philadelphia, Pa., and John Leheup Archibald, Slough, England, assignors to American Home Products Corporation, New York, N.Y., a corporation of Delaware
No Drawing. Filed Dec. 7, 1966, Ser. No. 599,726
Int. Cl. C07d 27/70, 27/74
U.S. Cl. 260—326.15    5 Claims

ABSTRACT OF THE DISCLOSURE

This invention relates to indoleglyoxyloylpyrroles which possess central nervous system activity, specifically depressant and anticonvulsant action.

---

This invention relates to substituted indoles and their preparation. More particularly, the invention involves indoleglyoxyloylpyrroles and reduction products thereof.

The compounds of the invention fall within the scope of those substituted indoles which may be illustrated by the following formula:

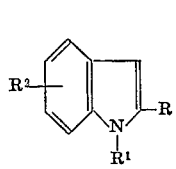

In the above structural formula, R, $R^1$ and $R^2$ may be the same or different radicals, standing for hydrogen, lower alkyl, halogen, lower alkoxy or hydroxy. The symbols A and B, which may be the same or different, stand for

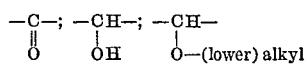

or $-CH_2-$ while $R^3$, $R^4$, $R^5$, and $R^6$ are intended to represent either hydrogen, lower alkyl, monocyclic aryl, acyl, carbo(lower)alkoxy, cyano(lower)alkyl, amino(lower)alkyl or di(lower)alkylamino(lower)alkyl.

The compounds deemed to be patentable possess useful pharmacological characteristics, demonstrating central nervous system activity, specifically depressant and anticonvulsant action.

In addition, compounds of the invention have shown anti-inflammatory activity as indicated under standard testing procedures. Thus, utility in the field of experimental and comparative pharmacology in these areas is shown when compounds are administered in a dosage range of 5 to 200 mg. per kilogram of body weight, either parentally or orally. The active material may be combined with other similarly active compounds or used alone, with or without excipients, diluents or carriers.

Preparation of the compounds basically involves one of the following reaction schemes:

Reaction (1)

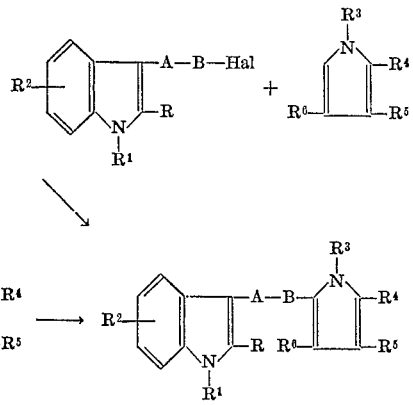

Reaction 2

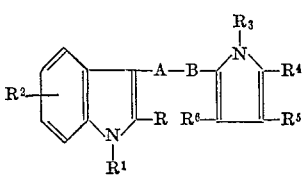

In the illustrative reaction R to $R^6$, A, and B represent the radicals indicated hereinabove. The symbol "Hal" is intended to represent chlorine, bromine or iodine but preferably chlorine. The reaction is carried out in suitable solvent medium, for example, tetrahydrofuran. Reaction takes place at a temperature from about 20° C. to the refluxing temperature of the reaction mixture. Where A or B or both involve an oxygenated radical, the product of the reaction may be easily reduced with well known reducing agents, preferably, lithium aluminum hydride.

The following examples will serve to illustrate the best mode for preparing compounds of the invention. Temperatures as given below as to be understood as representing degrees centigrade.

EXAMPLE 1

[1-(2-cyanoethyl)pyrrol-2-yl]indol-3-ylglyoxal

A solution of 1-(2-cyanoethyl)pyrrole (5.0 g.) in tetrahydrofuran (10 ml.) was added to a stirred solution of indole-3-glyoxyloyl chloride (8.5 g.) in tetrahydrofuran (90 ml.). The mixture was refluxed for 5 min., then hexane was added until crystallization commenced. After letting the mixture cool, the crystals were collected. Recrystallization from ethanol afforded the product (6.5 g.) M.P. 174–5°.

Analysis.—Calc'd. for $C_{17}H_{13}N_3O_2$: C, 70.09; H, 4.50; N, 14.43%. Found: C, 70.01; H, 4.45; N, 14.47%.

EXAMPLE 2

Indol-3-yl(1-methylpyrrol-2-yl) glyoxal

Freshly redistilled 1-methylpyrrole (12.15 g.) was added dropwise to a solution of indole-3-glyoxyloyl chloride (31.35 g.) in tetrahydrofuran (350 ml.). The reaction mixture was kept at room temperature for 1 hr., then n-hexane (600 ml.) was added. The resulting crystals were collected and recrystallized from ethanol to give the product (21.5 g.) M.P. 197–9°.

*Analysis.*—Calc'd. for $C_{15}H_{12}N_2O_2$: C, 71.41; H, 4.80; N, 11.14%. Found: C, 71.31; H, 4.78; N, 11.14%.

In the manner illustrated above, one may react 1-methylpyrrole with a solution of 1-methyl-5-chloroindole-3-glyxyloyl chloride, thereby producing [1-methylpyrrole-2-yl]-5-chloroindol-3-ylglyoxal. If one reacts 1,2-dimethylpyrrole and 5-methoxy-indole-3-glyoxyloyl chloride the product obtained would be [1,2-dimethylpyrrol-5-yl]-5-methoxyindol-3-ylglyoxal. Similarly, reacting 2,4-dimethyl-3-acetylpyrrole and indole-3-glyoxyloyl chloride would yield [2,4-dimethyl-3-acetylpyrrol-5-yl] indol-3-ylglyoxal.

EXAMPLE 3

3-[2-(1-methylpyrrol-2-yl)ethyl]indole

The title compound of Example 2 (5.0 g.) was added in portions to a stirred suspension of lithium aluminum hydride (4.5 g.) in 1,2-dimethoxyethane (100 ml.). The stirred reaction mixture was refluxed for 18 hr., then cooled. Water (12 ml.) was added drop-wise and the inorganic precipitate was filtered off. The filtrate was evaporated and the residue was recrystallized from aqueous ethanol to give the product M.P. 113–115° C.

*Analysis.*—Calc'd. for $C_{15}H_{16}N_2$: C, 80.32; H, 7.19; N, 12.49%. Found: C, 80.17; H, 7.39; N, 12.33%.

Carrying out reduction procedures on the unreduced glyoxal compounds, in the manner as taught in Example 3, will produce 3-[2(1-aminoethylpyrrol-2-yl)ethyl]indole from the compound of Example 1, and respectively, 1 - methyl - 3-[2-(1-methylpyrrol-2-yl)ethyl]-5-chloroindole; 3-[2 - 1-2-dimethylpyrrol-5-yl)ethyl]-5-methoxyindole; and 3-[2-(2,4-dimethyl-3[hydroxy]ethylpyrrol-5-yl)ethyl]indole from the unreduced glyoxal compounds mentioned in the second paragraph under Example 2.

We claim:
1. A compound having the formula:

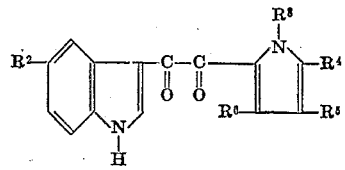

wherein $R^2$ is a member of the group consisting of hydrogen and methoxy; $R^3$ stands for a member of the group consisting of hydrogen, methyl, and cyanoethyl; $R^4$ and $R^6$ are selected from the group consisting of hydrogen and methyl; while $R^5$ is a member of the group consisting of hydrogen and acetyl.

2. [1-(2-cyanoethyl)pyrrol-2-yl]indol-3-yl)glyoxal.
3. Indol-3-yl(1-methylpyrrol-2-yl)glyoxal.
4. [1,2 - dimethylpyrrol-5-yl]-5-methoxyindol-3-ylglyoxal.
5. [2,4-dimethyl-3-acetylpyrrol-5-yl] indol-3-ylglyoxal.

References Cited

Rosell et al.: Chemical Abstracts, vol. 51:12324h. (1957), Abs. of Acta Pharmacol. Toxicol. 13:289-300 (1957).

ALEX MAZEL, Primary Examiner

J. A. NARCAVAGE, Assistant Examiner

U.S. Cl. X.R.

260—326, 999